(12) United States Patent
Rinner et al.

(10) Patent No.: US 9,972,426 B2
(45) Date of Patent: May 15, 2018

(54) ELECTRONIC COMPONENT

(71) Applicant: EPCOS AG, Munich (DE)

(72) Inventors: Franz Rinner, Deutschlandsberg (AT); Christoph Auer, Graz (AT); Manfred Schweinzger, Schwanberg (AT)

(73) Assignee: EPCOS AG, Munich (DE)

( * ) Notice: Subject to any disclaimer, the term of this patent is extended or adjusted under 35 U.S.C. 154(b) by 0 days. days.

(21) Appl. No.: 15/313,939

(22) PCT Filed: May 20, 2015

(86) PCT No.: PCT/EP2015/061084
§ 371 (c)(1),
(2) Date: Nov. 23, 2016

(87) PCT Pub. No.: WO2015/181014
PCT Pub. Date: Dec. 3, 2015

(65) Prior Publication Data
US 2017/0213623 A1    Jul. 27, 2017

(30) Foreign Application Priority Data
May 27, 2014   (DE) .................. 10 2014 107 450

(51) Int. Cl.
*H01C 7/10* (2006.01)
*H01C 7/04* (2006.01)
*H01C 1/148* (2006.01)

(52) U.S. Cl.
CPC ............. *H01C 7/041* (2013.01); *H01C 1/148* (2013.01); *H01C 7/042* (2013.01)

(58) Field of Classification Search
CPC ......... H01C 7/041; H01C 7/042; H01C 1/143
(Continued)

(56) References Cited

U.S. PATENT DOCUMENTS 5,952,911 A    9/1999  Kawase et al.
6,147,587 A *  11/2000  Hadano .................. H01C 7/10
                                                        338/21
(Continued)

FOREIGN PATENT DOCUMENTS

DE    19958235 A1    6/2000
DE    69731592 T2   12/2005
(Continued)

OTHER PUBLICATIONS

"NTC Thermistors for Inrush Current Limiting," Epcos AG, May 11, 2006, 5 pages.
(Continued)

*Primary Examiner* — Kyung Lee
(74) *Attorney, Agent, or Firm* — Slater Matsil, LLP

(57) ABSTRACT

An electronic component is disclosed. In an embodiment, the electronic component includes a plurality of functional layers arranged one on top of the other forming a stack, first inner electrodes, and second inner electrodes, each of the first and second inner electrodes arranged between two adjacent functional layers. The electronic component further includes a first outer contact electrically connected to the first inner electrodes and a second outer contact electrically connected to the second inner electrodes, wherein the functional layers are selected such that the first and second outer contacts are electrically conductively connected to one another via the functional layers both in a basic state and in a hot state of the electronic component, wherein a temperature of the hot state is higher than a temperature of the basic state, and wherein the electronic component is an NTC component.

20 Claims, 3 Drawing Sheets

(58) Field of Classification Search
USPC .................................................. 338/22 R
See application file for complete search history.

(56) References Cited

U.S. PATENT DOCUMENTS

| | | | | |
|---|---|---|---|---|
| 6,163,246 | A * | 12/2000 | Ueda | H01C 1/146 338/22 R |
| 6,222,262 | B1 | 4/2001 | Ueno et al. | |
| 6,525,395 | B1 * | 2/2003 | Kawase | H01C 1/16 257/528 |
| 7,135,955 | B2 * | 11/2006 | Feichtinger | B32B 18/00 257/700 |
| 7,295,421 | B2 | 11/2007 | Mihara et al. | |
| 7,524,337 | B2 * | 4/2009 | Rosc | H01C 1/1413 264/616 |
| 7,554,249 | B2 | 6/2009 | Braun et al. | |
| 8,258,915 | B2 | 9/2012 | Koto | |
| 8,947,193 | B2 * | 2/2015 | Rinner | H01C 1/1413 338/22 R |
| 9,058,913 | B2 | 6/2015 | Feltz | |
| 2006/0279172 | A1 * | 12/2006 | Ito | H01C 7/18 310/328 |
| 2010/0206624 | A1 | 8/2010 | Feichtinger | |
| 2012/0200969 | A1 | 8/2012 | Hirose | |
| 2013/0207770 | A1 * | 8/2013 | Rinner | H01C 1/1413 338/22 R |
| 2014/0056327 | A1 | 2/2014 | Maier et al. | |

FOREIGN PATENT DOCUMENTS

| | | |
|---|---|---|
| DE | 102007044604 A1 | 4/2009 |
| DE | 112004000186 B4 | 10/2009 |
| DE | 102010024863 A1 | 12/2011 |
| DE | 102010044856 A1 | 3/2012 |
| DE | 102011004799 A1 | 8/2012 |
| DE | 102011014967 A1 | 9/2012 |
| EP | 1277215 A1 | 1/2013 |
| JP | S56165573 | 12/1981 |
| JP | H05243007 A | 9/1993 |
| JP | H06314601 A | 11/1994 |
| JP | H088101 A | 1/1996 |
| WO | 2004093102 A1 | 10/2004 |
| WO | 2008041481 A1 | 4/2008 |
| WO | 2011052518 A1 | 5/2011 |

OTHER PUBLICATIONS

Philippow, E., "Electrical Engineering Pocket Book," vol. 1, General Principles, 1986, 3 pages.

* cited by examiner

ELECTRONIC COMPONENT

This patent application is a national phase filing under section 371 of PCT/EP2015/061084, filed May 20, 2015, which claims the priority of German patent application 10 2014 107 450.5, filed May 27, 2014, each of which is incorporated herein by reference in its entirety.

TECHNICAL FIELD

The present invention relates to an electronic component, an arrangement and a system having an electronic component as well as a use of the electronic component.

BACKGROUND

A problem to be solved is to specify an improved electronic component, in particular a multi-layered component, and/or an improved arrangement which is configured or optimized, in particular, for specific applications.

SUMMARY OF THE INVENTION

An embodiment of an electronic component comprises a multiplicity of functional layers arranged one on top of the other to form a stack, first inner electrodes and second inner electrodes, wherein each of the first and second inner electrodes is arranged between two adjacent functional layers. The electronic component expediently accordingly comprises a multiplicity of first inner electrodes and a multiplicity of second inner electrodes.

The electronic component is preferably a multi-layered component. The functional layers are preferably electrically active, for example layers with a negative temperature coefficient. The functional layers are expediently ceramic layers, for example made of metal oxides of comprising the latter.

The first inner electrodes are preferably each directly connected in an electrically conductive fashion to a first outer contact of the electronic component. Furthermore, the second inner electrodes are preferably each directly connected in an electrically conductive fashion to a second outer contact of the electronic component. The second outer contact is expediently different from the first outer contact and is arranged, for example, on a side of the electronic component lying opposite the first outer contact. The first and the second outer contacts can each be an outer electrode of the electronic component. The first inner electrodes are expediently connected exclusively to the first outer contact, and the second inner electrodes are connected exclusively to the second outer contact in an electrically conductive fashion.

The functional layers are, furthermore, selected in such a way that the first and second outer contacts of the electronic component are electrically conductively connected to one another via the functional layers both in a basic state of the electronic component and in a hot state of the electronic component that is to say at a temperature which is higher than that of the electronic component in the basic state.

The functional layers and/or inner electrodes are preferably arranged equidistantly in the stack.

The basic state can be an unloaded state, wherein, for example, no electrical power is applied to the electronic component. The basic state particularly preferably describes the state of the electronic component at room temperature or, in particular, at 25° C. The basic state can also describe the standard temperature as well as the standard pressure conditions.

In contrast, the hot state can signify a loaded state, for example with an electrical voltage which is applied to the component and/or to the outer contacts or with an applied electrical current.

Alternatively or additionally, the temperature range between the basic state and the hot state can span, for example, any temperature range between −55° C. and +18° C. or can extend over this range. The temperature range can preferably extend between the basic state and the hot state over the range from −40° C. to +150° C.

Furthermore, the electronic component is an NTC component, that is to say a component with a negative temperature coefficient. The hot state of the electronic component preferably describes in this sense a state of the electronic component which is heated, for example, by an applied electrical power. The hot state is preferably also a steady-state temperature state of the component.

By means of the electrically conductive connection between the first outer contact and the second outer contact, in particular in the basic state of the electronic component, it is advantageously possible to ensure, for example in contrast with conventional NTC components which have a nominal resistance in the Ω range or kΩ range in a basic state at 25° C., that a switch-on current of an electrical consumer which, for example in a corresponding application, is connected in series with the electronic component, is limited to such an extent that, for example, during the switch-on process the electrical voltage is still sufficiently high for the electrical supply of further important electrical components.

This can be advantageous and/or necessary, for example, in the application of the electronic component in the automobile sector, in particular for the use as a switch-on current limiter for electric starter motors in motor vehicles ("start/stop systems"). If, for example, the switch-on current is not sufficiently or appropriately limited, an on-board power system voltage can drop to such an extent that further safety-relevant applications such as ABS and ESP can no longer be supplied with the provided electrical voltage either. In this sense the electronic component according to the present illustration contributes directly to safety aspects and/or to the energy efficiency in road traffic.

NTC components are generally susceptible to the generation of what are referred to as hot spots, that is to say areas which, randomly or for structural reasons, become hotter than other areas, for example during the operation of the respective component. A hot spot causes further heating through positive feedback. In other words, this means that the hot spot experiences additional heating as a result of the fact that the electrical resistance drops according to the negative temperature coefficient behavior as the temperature increases. This can under certain circumstances bring about destruction of the component. As a result of the multilayer embodiment of the electronic component according to the present illustration, the generation of the hot spots can also advantageously be prevented or limited. This is attributable, on the one hand, to the relatively short distances or current paths between the electrodes, as a result of which the risk of the generation of the hot spots can be restricted. On the other hand, in particular as a result of the positive temperature coefficient (PTC) behavior of the inner electrodes and as a result of the fact that the electrical current decisively also flows through the inner electrodes during the operation of the electronic component, with the result that the electrical resistance of the electronic component is also essentially determined by the inner electrodes, the generation of hot spots may be prevented or at least limited. In other words, the electrical behavior of the inner electrodes can at least partially compensate or prevent the abovementioned positive feedback in the negative temperature coefficient functional layers and the generation of the hot spots.

In one preferred embodiment, the specific electrical resistance of the functional layers, preferably each individual functional layer, in the basic state of the electronic component is between 0.1 $\Omega$m and 0.3 $\Omega$m. This embodiment can advantageously make possible the inventive electrically conductive connection between the first outer contact and the second outer contact via the functional layers.

In one preferred embodiment, the number of functional layers of the electronic component is between 20 and 120. As a result of this embodiment or as a result of the multi-layered embodiment of the electronic component in general, the electrical resistance and/or the corresponding drop in voltage between two adjacent inner electrodes of opposite polarity, that is to say different inner electrodes and/or between the first outer contact and the second outer contact can be expediently reduced. Furthermore, the electrical current load bearing capacity and/or current carrying capability of the electrical component can be advantageously increased by the multi-layered embodiment.

In particular, the electrical contact formation of the multiplicity of first inner electrodes and second inner electrodes with the first or second outer contact, wherein the inner electrodes are respectively arranged between two adjacent functional layers, effectively constitutes a parallel connection of individual NTC components, as a result of which when the electronic component is loaded the electric current is distributed among the individual inner electrodes or functional layers.

In one preferred configuration, the functional layers comprise a doped semiconductor material, in particular a compound semiconductor material and/or a ceramic material. As a result of this configuration, the electrical properties according to the invention, for example the electrically conductive connection between the outer contacts in the basic state of the component, can be particularly expediently brought about and/or adjusted.

In one preferred embodiment, the functional layers comprise an oxide of at least one of the elements iron, cobalt, nickel, copper or zinc. The functional layers preferably contain the specified materials or oxides as main components, that is to say, for example, with portions of more than 50% in terms of mass, volume or mole units.

In addition to the specified materials, the functional layers can contain further, chemically stabilizing oxides which prevent, for example, (further) oxidation of the functional layers which is detrimental for the electrical properties of the electronic component.

In one embodiment, the functional layers respectively have a layer thickness between 10 µm and 100 µm, particularly preferably between 20 µm and 40 µm.

If reference is made to functional layers in the present presentation, preferably each individual specified functional layer is meant.

In one preferred embodiment, each of the first and second inner electrodes is an inner electrode layer with, for example, a layer thickness between 2 µm and 15 µm. Alternatively, each of the first and second inner electrodes can comprise an inner electrode layer as described. The layer thickness of the first and second inner electrodes is particularly preferably between 5 µm and 10 µm.

In one preferred embodiment, the first inner electrodes and the second inner electrodes are configured in the same way as one another and/or in relation to the respective other type.

The specified layer thicknesses of the functional layers and those of the inner electrodes are expedient, in particular, in relation to the electrical properties of the electronic component as well as in terms of the manufacture of the component or the deposition of the inner electrodes, for example by means of a screen printing method.

In one preferred embodiment, the electrical nominal resistance of the electronic component is between 10 m$\Omega$ and 25 m$\Omega$.

The electrical nominal resistance preferably describes the electrical resistance of the unloaded electronic component between the outer contacts at an ambient temperature of 25° C.

In one preferred embodiment, the first and second inner electrodes are arranged one on top of the other in an alternating fashion when viewed in the stacking direction. As a result of this embodiment, an electrically active area can be particularly expediently formed, for example in an overlapping area between the first inner electrodes, on the one hand, and the second inner electrodes, on the other.

In one preferred embodiment, the first inner electrodes correspondingly overlap with the second inner electrodes.

In one preferred embodiment, the first and the second inner electrodes are each directly connected to the first or the second outer contact in an electrically conductive fashion.

In the case of the illustrated electronic component, it is advantageous, in particular for the electrically conductive connection of the outer contacts via the functional layers, to keep the internal resistance or series resistance of the inner electrodes particularly low. This can be achieved by means of inner electrodes which are relatively thick, for example in comparison to the functional layers. On the other hand, using, for example, a corresponding screen printing method it is not readily possible, or only possible with difficulty, in technological terms to implement a reduction in the thickness of the functional layers, for example while the layer thickness of the inner electrodes remains constant.

In one preferred embodiment, the electronic component has further free electrodes which are electrically connected to the first and second inner electrodes only via the functional layers, that is to say indirectly. The free electrodes preferably also constitute inner electrodes of the electronic component. According to this refinement, each of the free electrodes preferably at least partially overlaps with the first and second inner electrodes when viewed in a plan view of the electronic component. Accordingly, according to this embodiment, an inner or internal series connection or multi-layered series connection of the electronic component can furthermore advantageously be formed. A specific advantage of this series connection relates to the possible embodiment of a particularly low series resistance of the inner electrodes and/or the possibility of adapting and/or increasing the thermal capacity of the functional layers or of the electronic component to further parameters. This can be achieved, in particular, by means of the reduced layer thicknesses and/or by means of the thicknesses of the inner electrodes which are reduced, for example, in comparison with the functional layers.

In one preferred embodiment, the free inner electrodes are arranged stacked one on top of the other. This embodiment also expediently permits the embodiment with the above-mentioned multi-layered series connection.

In one preferred embodiment, the first and second inner electrodes are spaced apart when viewed in a plan view of the electronic component. In other words, the first and second inner electrodes are overlap-free, for example when viewed in a plan view of the electronic component. The overlap-free embodiment of the first and second inner electrodes is also expedient, in particular, for the embodiment of the multi-layered series connection.

In one preferred embodiment, the electronic component is embodied in accordance with a multiple internal series connection. According to this embodiment, the further electrodes are preferably also embodied one on top of the other, but in a plurality of partial stacks which are electrically connected one to the other only indirectly via the functional layers. According to this embodiment, the series resistance of inner electrodes can preferably be reduced further.

A further aspect of the present application relates to an arrangement comprising a parallel connection of a plurality of electronic components as described above. According to this embodiment, a plurality of electronic components, which are preferably each embodied as a multi-layered component, are therefore preferably connected in parallel. As a result of this embodiment, the electrical current load bearing capacity or current carrying capability of the arrangement can be advantageously further increased compared to an individual electronic component. The arrangement is correspondingly preferably an NTC arrangement.

A further aspect of the present application relates to a system having the electronic component or having the arrangement which also comprises an, expediently electrical, consumer device. The electrical consumer device is connected electrically in series with the electronic component or the arrangement and is subjected, together with the electronic component or the arrangement, to an ambient temperature, preferably in particular a common, single ambient temperature. Furthermore, the system is embodied in such a way that the heating time, that is to say the time in which the switch-on current of the consumer device heats up the electronic component or the arrangement to a steady-state temperature, is adjusted to the electrical start-up time of the consumer device, which start-up time in turn determines when the switch-on current has dropped to the nominal current of the consumer device.

The system can correspondingly also comprise an electrical power source which is expediently designed to make available the specified switch-on current.

The steady-state temperature preferably constitutes the temperature of the abovementioned hot state of the electronic component. Furthermore, the steady-state temperature preferably alternatively or additionally describes an equilibrium temperature and/or an operating temperature of the system. The steady-state temperature is preferably 120° C. or approximately 120° C.

The electronic component or the arrangement is expediently heated to the steady-state temperature merely by self-heating, preferably caused by the switch-on current, wherein heating by thermal radiation or thermal conduction through one or other components of the system is negligible or not decisive.

As a result of the adjustment of the heating time to the start-up time or conversely, it is advantageously possible, for example in contrast with the situation in which the heating time is made too short compared to the electrical start-up time, to prevent damage to further components which interact electrically with the system or the consumer device.

Furthermore, by means of the specified adjustment it is possible, for example in contrast to the situation in which the heating time is made too long compared to the electrical start-up time, advantageously to achieve satisfactory, reliable operation of the consumer device, for example in conjunction with the abovementioned further components which interact with the system or the consumer device.

The heating time is preferably or expediently equal to or slightly shorter than the start-up time. Overall, the electronic component, the arrangement and/or the system are preferably embodied in such a way that the heating time and the start-up time are at least largely the same. For this purpose, for example the electrical start-up behavior of the consumer device can be correspondingly adapted to the heating behavior of the functional layers and/or of the electronic component or of the arrangement. The start-up time is preferably approximately 50 ms.

The further specified components can, as indicated above, designate electrical components of the on-board power system of a motor vehicle, such as the ABS or ESP system.

In one preferred embodiment of the system, the heating time and the electrical start-up time are the same.

In one preferred embodiment of the system, the ratio of the heating time with respect to the electrical start-up time is 0.5 to 1.5.

A further aspect of the present application relates to the use of an electronic component or of the arrangement for the specified system. The electrical consumer device can be, for example, a starter motor for a motor vehicle. The electronic component then expediently functions as a switch-on current limiter (inrush current limiter).

Furthermore, a method for manufacturing or adjusting the system is specified. The method comprises making available an electronic component or an arrangement which comprises the latter, a consumer device which is electrically connected in series therewith, and an electrical power source which is connected to the specified components, at a common ambient temperature. Furthermore, the method comprises adjusting the heating time, that is to say the time in which the switch-on current for the consumer device heats up the electronic component or the arrangement to the steady-state temperature, to the electrical start-up time which determines when the switch-on current has dropped to the nominal current of the consumer device. The method furthermore comprises completing the system.

In one preferred embodiment of the method, the heating time is adjusted to the specified start-up time by the selection of the materials or the functional layers and their thickness and number. By means of this embodiment, the specified adjustment can advantageously be achieved by means of the thermal capacity of the functional layers.

Alternatively, within the scope of the system and/or of the method the specified start-up time can conversely be or become correspondingly adjusted to the heating time.

The system or the electronic component or the arrangement described above can preferably be manufactured or is manufactured by means of the method described here. In particular, all of the features disclosed for the method can also relate to the system described above or to the electronic component or to the arrangement, and conversely.

BRIEF DESCRIPTION OF THE DRAWINGS

Further advantages, advantageous embodiments and expedient features of the invention can be found in the following description of the exemplary embodiments in conjunction with the figures.

Elements which are the same, of the same type and act in the same way are provided with the same reference symbols in the figures. The figures and the size ratios of the elements with respect to one another which are illustrated in the figures are not to be considered true to scale. Instead, individual elements can be illustrated in an excessively large fashion for the sake of better illustration and/or for the sake of better clarity.

DETAILED DESCRIPTION OF ILLUSTRATIVE EMBODIMENTS

Figure 1:
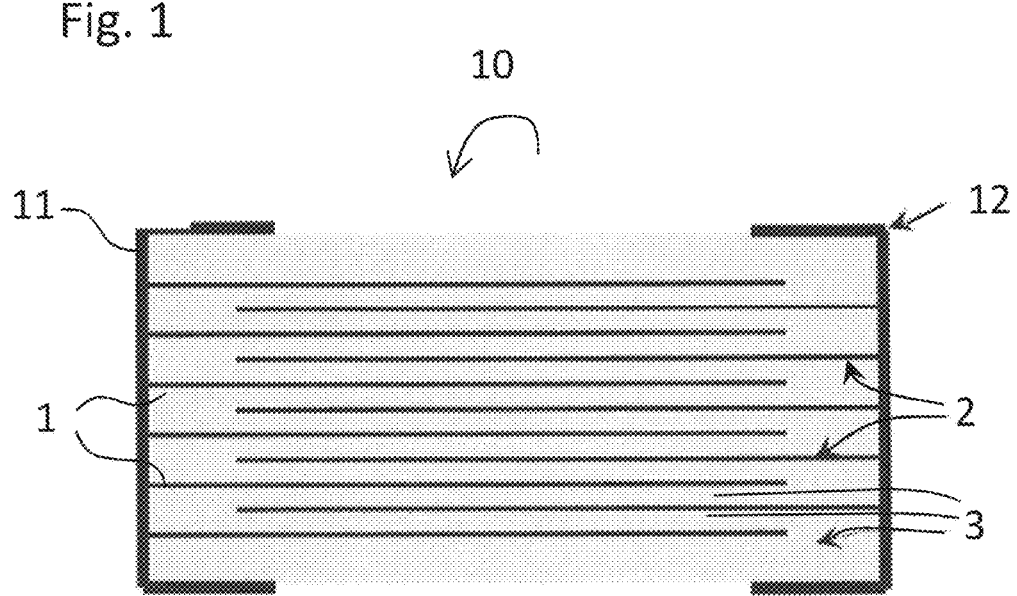
FIG. 1 shows a schematic sectional view of an electronic component.

FIG. 1 shows a schematic sectional view of an electronic component 10. The electronic component 10 is preferably an NTC component, in particular a multi-layered component. The electronic component 10 is preferably used as a switch-on current limiter, in particular for electric starter motors in "start/stop systems" for motor vehicles.

The electronic component comprises a multiplicity of first inner electrodes 1. Furthermore, the electronic component 10 comprises a multiplicity of second inner electrodes 2. For example, the electronic component 10 according to the illustration in FIG. 1 can have in each case six first inner electrodes 1 and six second inner electrodes 2.

Furthermore, the electronic component has a first outer contact 11. The first inner electrodes are directly connected to the first outer contact 11 in an electrically conductive fashion. Furthermore, the electronic component 10 has a second outer contact 12. Furthermore, the second inner electrodes 2 are directly connected in an electrically conductive fashion to the second outer contact 12. The first outer contact 11 is arranged on a first side of the electronic component 10. Furthermore, the second outer contact 12 is arranged on a second side, lying opposite the first side (sides not explicitly characterized), of the electronic component 10.

Furthermore, the electronic component 10 has a multiplicity of functional layers 3. The functional layers 3 are arranged one on top of the other to form a stack. Each of the first and second inner electrodes 1, 2 is arranged between two adjacent functional layers 3. The functional layers 3 are preferably doped semiconductor material, for example compound semiconductor material and/or a ceramic material. In particular, the functional layers can contain an oxide of at least one of the elements iron, cobalt, nickel, copper or zinc and, for example, additional, chemically stabilizing oxides.

The first and second inner electrodes 1, 2 are preferably embodied in the same way. Furthermore, the first inner electrodes 1 overlap, for example when viewed in a plan view of the electronic component 10, with the second inner electrodes 2, for example in order to form an electrical active area, e.g. the overlapping area.

According to the illustration in FIG. 1, the first and second inner electrodes 1, 2 are expediently arranged one on top of the other in an alternating fashion when viewed in the stacking direction.

The first and second inner electrodes 1, 2 are inner electrode layers. The layer thickness of the inner electrodes is preferably between 2 µm and 15 µm. The layer thickness of the first and second inner electrodes is, according to FIG. 1, for example 10 µm or less.

The layer thickness of the functional layers 3, which are also preferably embodied here to be the same or similar, is preferably between 10 µm and 100 µm or between 10 µm and 50 µm, for example 40 µm in FIG. 1.

The functional layers 3 are preferably selected in such a way that the first and the second outer contacts 1, 2 of the electronic component 10 are electrically conductively connected to one another via the functional layers 3 both in a basic state and in a hot state of the electronic component. The specific electrical resistance of the functional layers 3 in the basic state of the electronic component 10 is preferably between 0.1 Ωm and 0.3 Ωm. The specific electrical resistance of the functional layers is particularly preferably 0.18 Ωm.

The B value (thermistor constant) of the functional layers 3 is preferably 2620 K.

The basic state preferably describes a temperature of the electronic component of 25° C. and/or at room temperature.

The hot state preferably describes a temperature of the electronic component which is higher than the temperature of the electronic component in the basic state. The hot state is preferably an operating state in which the electronic component 10 has assumed an operating temperature. The operating temperature can be a steady-state temperature, for example of the loaded electronic component 10. In contrast, the basic state preferably describes an unloaded state of the electronic component 10.

The temperature range between the basic state and the hot state can extend, for example, over the temperature range between −55° C. and +180° C. The temperature range particularly preferably extends between the basic state and the hot state over the range from −40° C. to +150° C.

In contrast to the illustration in FIG. 1, the electronic component can comprise, for example, between 20 and 120 functional layers which are arranged one on top of the other. The electronic component particularly preferably comprises, for example, 72 functional layers which are arranged one on top of the other.

The electrical conductivity between the first outer contact 11 and the second outer contact 12 via the functional layers 3 is advantageously favored by the multi-layered embodiment of the electronic component 10, since, for example, a drop in voltage between a first inner electrode 1 and a second inner electrode 2 which is adjacent thereto during the operation of the electronic component 10 is advantageously measured as being significantly lower than e.g. over the sum of all the functional layers or—for example in the case of conventional NTC components which are not of a multi-layered design, over the entire "functional body".

Furthermore, as a result of the multi-layered embodiment, the current load bearing capacity and/or current carrying capability of the electronic component can be increased up to current strengths of several 100 A for example in contrast with conventional NTC components. This is made possible, in particular, by the effective parallel connection of a plurality of NTC partial components by virtue of the multi-layered design.

The electrical resistance, in particular the nominal resistance (for example at a temperature of 25° C.) of the electronic component is preferably between 10 mΩ and 25 mΩ according to the present illustration.

A length of the electronic component 10 can be, for example, 5.6 mm and a width of the electronic component can be, for example, 4.8 mm.

Figure 2:
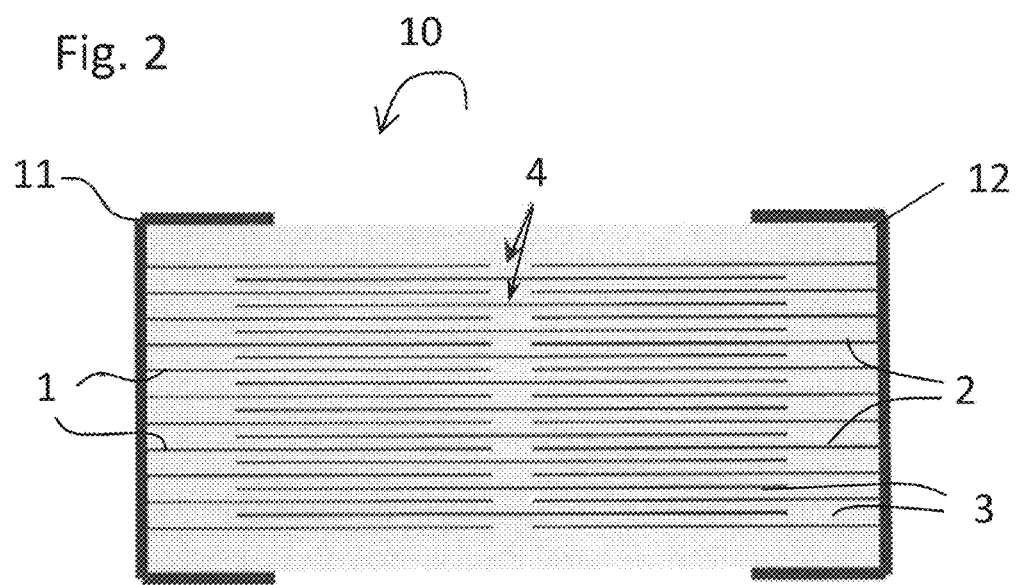
FIG. 2 shows a schematic sectional view of the electronic component according to an alternative embodiment.

FIG. 2 shows a schematic sectional view of the electronic component 10 according to an embodiment which is an alternative to FIG. 1. The electronic component according to FIG. 2 relates to an embodiment with an inner or internal multi-layered series connection, in particular of the inner electrodes of the electronic component 10. For this purpose, the electronic component 10, in contrast to FIG. 1, comprises further free electrodes 4 which also constitute inner electrodes.

In contrast to FIG. 1, the first and second inner electrodes 1, 2 are not arranged alternately but rather opposite one another when viewed laterally. Furthermore, the free electrodes 4 are each arranged between two first and two second inner electrodes 1, 2. The free electrodes 4 are furthermore arranged one on top of the other in the stacking direction. Furthermore, the free electrodes 4 expediently each overlap at least partially with the first inner electrodes 1 and the second inner electrodes 2.

In contrast to FIG. 1, the first and the second inner electrodes 1, 2 do not overlap, for example when viewed in a plan view of the electronic component 10 from FIG. 2, but are instead arranged spaced apart or in an overlap-free fashion in a plan view. The layer thickness of the first and second inner electrodes 1, 2 is, for example, 5 μm according to FIG. 2.

The free electrodes 4 are connected in an electrically conductive fashion to the first and second inner electrodes 1, 2 merely via the functional layers 3, that is to say indirectly.

The free electrodes 4 can, for example, be arranged completely in a base body (not explicitly characterized) of the electronic component 10, which base body comprises, for example, the functional layers 3 and/or the first and second inner electrodes 1, 2.

The electronic component according to FIG. 2 comprises eleven first inner electrodes 1 arranged one on top of the other and eleven second inner electrodes 2 arranged one on top of the other. Furthermore, the electronic component according to FIG. 2 comprises ten free electrodes 4 arranged one on top of the other.

In contrast to FIG. 1, according to which the electronic component comprises, for example, ten functional layers, the electronic component according to FIG. 2 comprises 20 functional layers, wherein the thickness of the functional layers is halved compared to FIG. 1. Furthermore, the thickness of the inner electrodes is halved or reduced compared to the illustration in FIG. 1. During the manufacture of the electronic component, the layer thickness of the individual inner electrodes (for example of the first and second inner electrodes 1, 2) can also be decreased by reducing the layer thickness of the individual functional layers. This is possible within the scope of a screen printing method which is particularly expedient for applying the inner electrodes. Accordingly, the layer thickness of the functional layers according to the embodiment in FIG. 2 is preferably 20 μm and the layer thickness of the inner electrodes is, for example, 5 μm.

By virtue of the inner multi-layered series connection it is possible, as described above, to obtain a particularly low series resistance of the inner electrodes and/or to adapt and/or increase the thermal capacity of the functional layers or of the electronic component.

A reduction in the series resistance, for example compared to the illustration from FIG. 1, with comparable electrical properties of the electronic component would also already be possible solely by halving the layer thicknesses. The electronic component would then be formed, for example, merely by the upper left-hand quarter of the cross-sectional illustration in FIG. 2. However, this would have, as a result of the smaller layer thicknesses (in comparison with the embodiment in FIG. 1) or as a result of less material, an overall lower thermal capacity and would heat up more quickly, for example during operation. In order to compensate for the changed thermal capacity and nevertheless be able to make use of the advantages of the lower series resistance of the inner electrodes, the cross section of the component 10 in FIG. 2 is, for example, adapted again to the cross section in FIG. 1.

Figure 3:
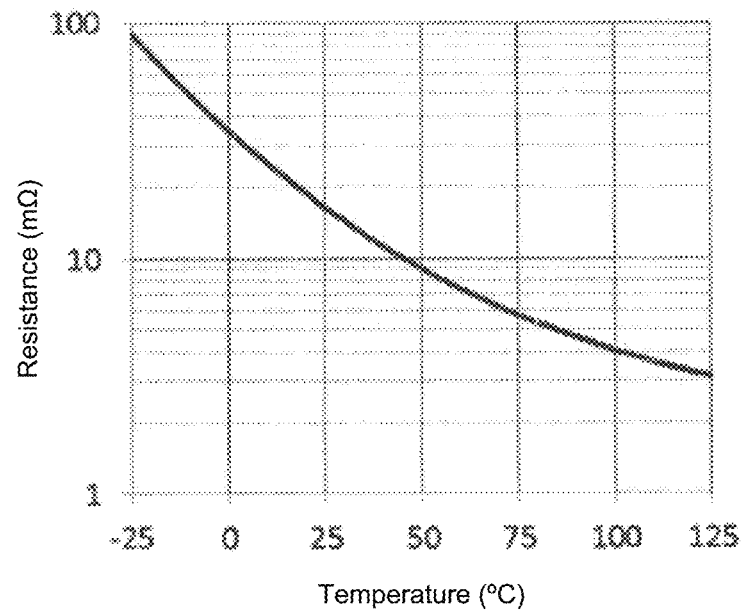
FIG. 3 shows a characteristic curve of an electronic component according to FIG. 2.

FIG. 3 shows a resistance temperature characteristic curve of the electronic component according to FIG. 2. In particular the electrical resistance of the component 10 is plotted against the temperature. The non-linear electrical behavior is apparent here. In the case of a temperature of 25° C., the electrical resistance, for example the electrical nominal resistance is approximately 18 mΩ.

Figure 4:
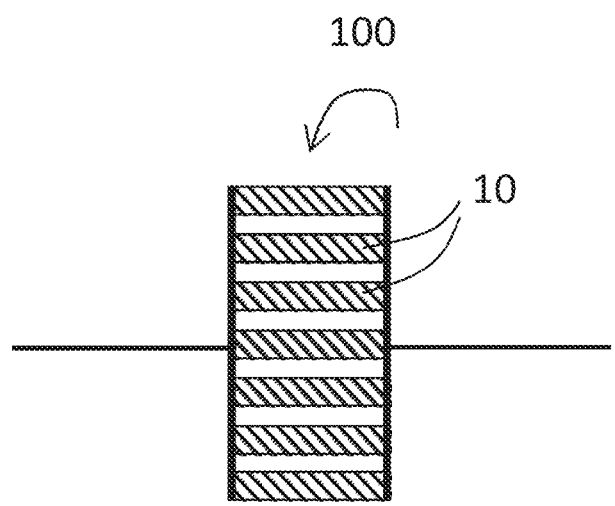
FIG. 4 shows a schematic illustration or an equivalent circuit diagram of an arrangement comprising a multiplicity of electronic components according to FIG. 2 or 3.

FIG. 4 shows a schematic illustration of an arrangement 100 (equivalent circuit diagram) in which seven electronic components are connected, as described above, in parallel with the arrangement 100. The parallel connection of individual electronic components, already configured, for example, with a multi-layered design, advantageously permits a further increase in the current load bearing capacity and/or current carrying capability, as described above.

Figure 5:
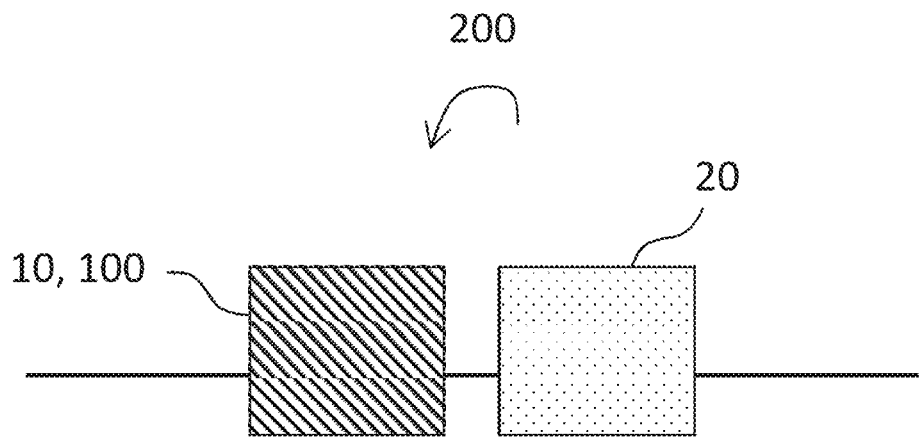
FIG. 5 shows a schematic view of a system comprising an arrangement according to FIG. 4 and an electronic component according to FIG. 2 or 3.

FIG. 5 shows a schematic illustration of a system 200 in which the electronic component 10 or the arrangement 100 is connected and/or arranged in series with an electrical consumer device 20. In the system 200, the heating time, that is to say the time in which the switch-on current of the consumer device 20 heats up or has heated up the electronic component 10 or the arrangement 100 to a steady-state temperature, preferably with adjustment to the electrical start-up time of the consumer device 20, given a common ambient temperature of the arrangement or of the electronic component 10 and of the consumer device 20. Furthermore, the electrical start-up time determines when the switch-on current of the consumer device 20 has dropped to the nominal current thereof. For example, the start-up time is approximately 50 ms.

Alternatively, within the scope of the system and/or within the scope of a manufacturing method or adjustment method of the system or for the system, the specified start-up time can conversely be/become correspondingly adjusted to the heating time.

As a result of the specified adjustment, in particular the operation of the system 200 can be optimized, for example as a switch-on current limitation in motor vehicles.

The steady-state temperature can describe, for example, a state in which the electrical power which is fed to the component or the arrangement is output to the surroundings by means of a heating line and/or thermal radiation in such a way that the temperature of the component or of the arrangement is not increased further.

Furthermore, the system 200 can correspondingly comprise an electrical power source (not explicitly characterized in the figures) which is expediently designed to make available the specified switch-on current.

In an exemplary embodiment of the system 200, the heating time and the electrical start-up time are the same. In a further exemplary embodiment of the system 200, the ratio of the heating time with respect to the electrical start-up time is 0.5 to 1.5.

Figure 6:
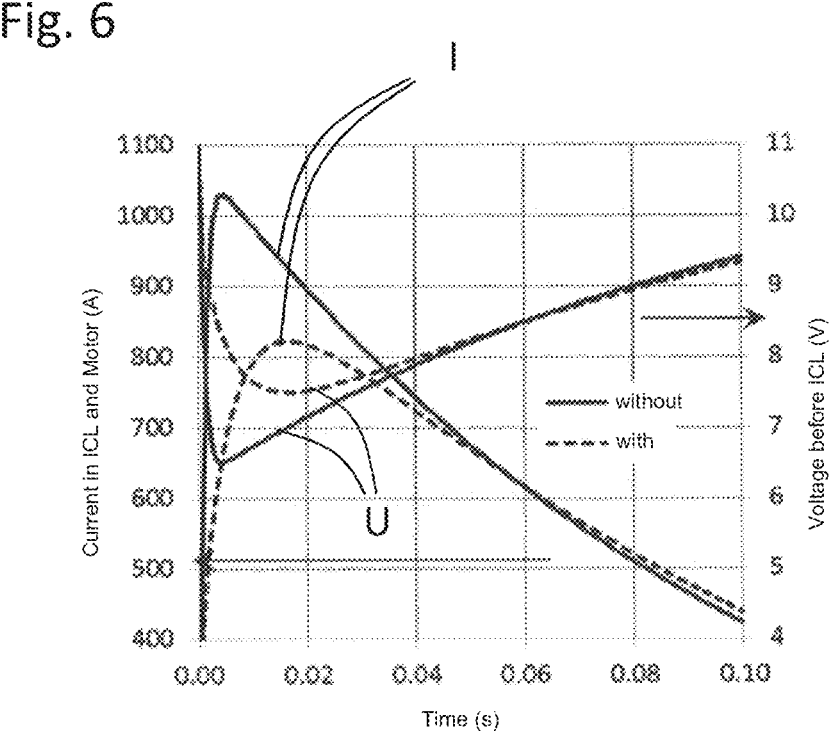
FIG. 6 shows the switch-on behavior of a consumer device with and without circuitry of the electronic component or of the arrangement.

FIG. 6 shows the electrical switch-on behavior of the consumer device 20 with and without a switch-on current limitation. The consumer device 20 is preferably an electric starter motor of a motor vehicle. In particular, the arrangement 100 is connected, for example according to FIG. 4 (parallel connection of seven components 10) in series with the consumer device 20 (cf. in this respect the system 200 from FIG. 5). In FIG. 6, the electrical current (I) is plotted against time (cf. left-hand ordinate axis). A time of 0 seconds corresponds here instantaneously to the switch-on process. Furthermore, on the right-hand ordinate axis the electrical voltage (U) is plotted against the electronic component.

The dashed lines respectively describe the current profile or voltage profile with the arrangement connected in series as a switch-on current limiter, while the continuous lines represent the current profile and voltage profile of the consumer device correspondingly without the arrangement, that is to say without limitation of the switch-on current. In particular, it is apparent that the switch-on current (characterized by I) is significantly higher shortly after the switch-on process, that is to say, for example, in the first 20 ms after the switch-on process, compared with the drop of the arrangement connected in series as a switch-on current limiter. Correspondingly, the voltage drop or the voltage (characterized by U) is also smaller shortly after the switch-on process, for example within the first 40 ms without switch-on current limitation, than with switch-on current limitation.

The invention is not limited by the description on the basis of the exemplary embodiments. Instead, the invention comprises any new feature and any combination of features, which includes, in particular, any combination of features in the patent claims, even if this feature or this combination is itself not explicitly specified in the patent claims or exemplary embodiments.

The invention claimed is:

1. A system comprising;
an electronic component, the electronic component comprising:
a plurality of functional layers arranged one on top of the other forming a stack;
first inner electrodes;
second inner electrodes, each of the first inner electrodes and the second inner electrodes arranged between two adjacent functional layers;
a first outer contact electrically connected to the first inner electrodes; and
a second outer contact electrically connected to the second inner electrodes,
wherein the functional layers are selected such that the first and second outer contacts are electrically conductively connected to one another via the functional layers both in a basic state and in a hot state of the electronic component,
wherein a temperature of the hot state is higher than a temperature of the basic state, and
wherein the electronic component is an NTC component; and
a consumer device electrically connected in series with the electronic component,
wherein the system is embodied such that a heating time is adjusted to an electrical start up time of the consumer device, wherein the heating time is defined as a time the electronic component is heated up to a steady-state temperature by a switch on current of the consumer device, and wherein the start up time is determined by a drop of the switch on current to a nominal current of the consumer device.

2. The system according to claim 1, wherein the plurality of functional layers has a specific electrical resistance in the basic state of the electronic component, and wherein the specific electrical resistance is between 0.1 Ωm and 0.3 Ωm.

3. The system according to claim 1, wherein a number of functional layers in the plurality of functional layers is between 20 and 120.

4. The system according to claim 1, wherein the plurality of functional layers comprises at least one of a doped compound semiconductor material or a ceramic material.

5. The system according to claim 1, wherein the plurality of functional layers comprises an oxide of at least one of iron, cobalt, nickel, copper or zinc.

6. The system according to claim 1, wherein the electronic component comprises an electrical nominal resistance between 10 mΩ, and 25 mΩ, wherein the nominal resistance is the electrical resistance of the electronic component when unloaded and at an ambient temperature of 25° C.

7. The system according to claim 1, wherein the first inner electrodes and the second inner electrodes are arranged one on top of the other in an alternating fashion when viewed in a stacking direction.

8. The system according to claim 1, further comprising free electrodes, wherein the free electrodes are electrically connected to the first inner electrodes and the second inner electrodes only via the functional layers.

9. The system according to claim 8, wherein the first inner electrodes and the second inner electrodes are spaced apart when viewed in a stacking direction.

10. The system according to claim 1, wherein a ratio of the heating time to the electrical start up time is 0.5 to 1.5.

11. The system according to claim 1, wherein the heating time and the electrical start up time are the same.

12. A system comprising:
an arrangement comprising a parallel connection of a plurality of electronic components, each of the electronic component comprising:
a plurality of functional layers arranged one on top of the other forming a stack;
first inner electrodes;
second inner electrodes, each of the first and second inner electrodes arranged between two adjacent functional layers;
a first outer contact electrically connected to the first inner electrodes; and
a second outer contact electrically connected to a second outer contact,
wherein the functional layers are selected such that the first and second outer contacts are electrically conductively connected to one another via the functional layers both in a basic state and in a hot state of the electronic component,
wherein a temperature of the hot state is higher than a temperature of the basic state,
wherein each of the electronic components is an NTC component; and
a consumer device which is connected electrically in series with the arrangement, the consumer device,
wherein the system is embodied such that a heating time is adjusted to an electrical start up time of the consumer device, wherein the heating time is defined as a time the electronic component is heated up to a steady-state temperature by a switch on current of the consumer device, and wherein the start up time is determined by a drop of the switch on current to a nominal current of the consumer device.

13. The system according to claim 12, wherein the plurality of functional layers has a specific electrical resistance in the basic state of the electronic component, and wherein the specific electrical resistance is between 0.1 Ωm and 0.3 Ωm.

14. The system according to claim 12, wherein a number of functional layers in the plurality of functional layers is between 20 and 120.

15. The system according to claim 12, wherein the plurality of functional layers comprises at least one of a doped compound semiconductor material or a ceramic material.

16. The system according to claim 12, wherein the plurality of functional layers comprises an oxide of at least one of iron, cobalt, nickel, copper or zinc.

17. The system according to claim 12, wherein the electronic component comprises an electrical nominal resistance between 10 mΩ, and 25 mΩ, wherein the nominal resistance is the electrical resistance of the electronic component when unloaded and at an ambient temperature of 25° C.

18. The system according to claim 12, wherein the first inner electrodes and the second inner electrodes are arranged one on top of the other in an alternating fashion when viewed in a stacking direction.

19. The system according to claim 12, further comprising free electrodes, wherein the free electrodes are electrically connected to the first and second inner electrodes only via the functional layers.

20. The system according to claim 19, wherein the first inner electrodes and the second inner electrodes are spaced apart when viewed in a stacking direction.

* * * * *